Sept. 22, 1959      C. O. GUSTAFSON      2,905,029
FLUID PRESSURE INDEXING APPARATUS
Filed Jan. 25, 1954      2 Sheets-Sheet 1
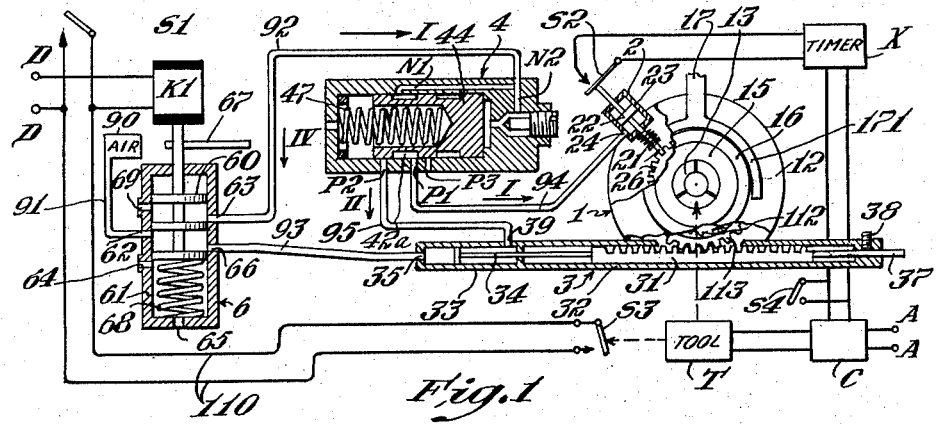
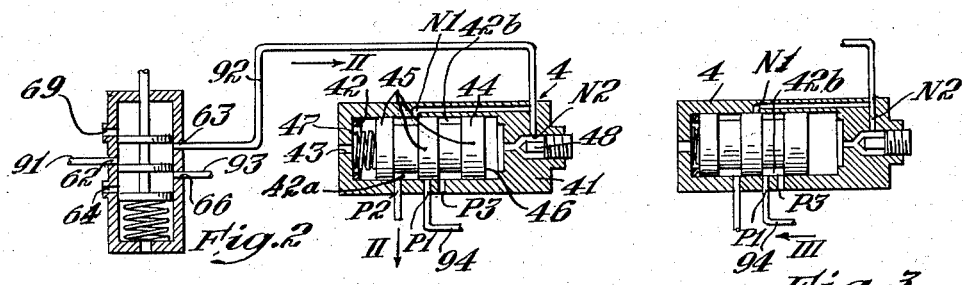
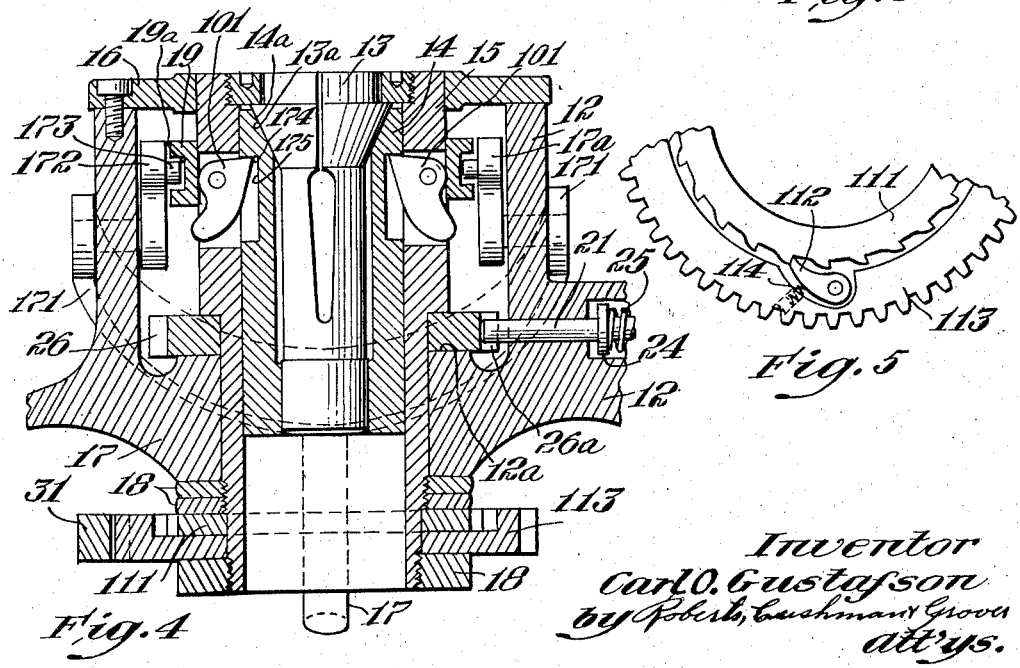
Inventor
Carl O. Gustafson
by Roberts, Cushman & Grover
att'ys.

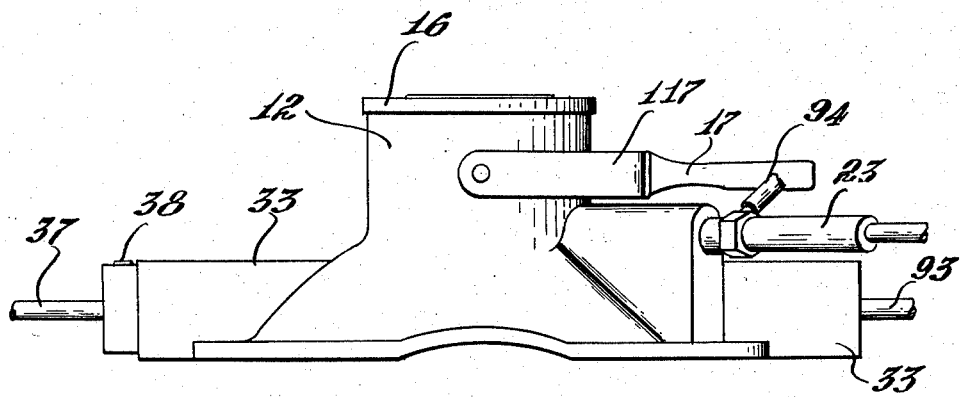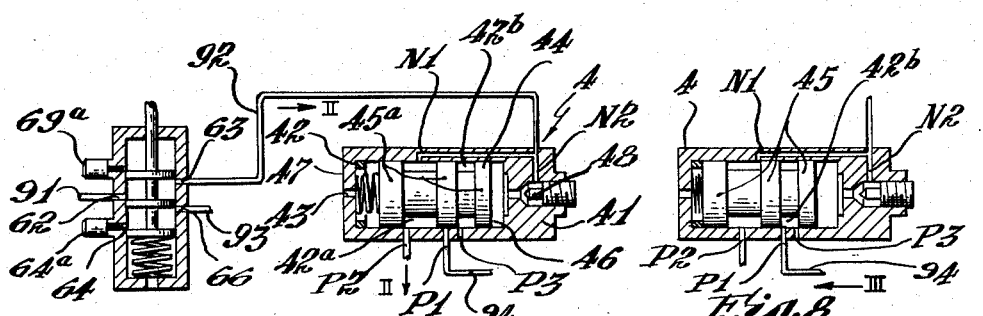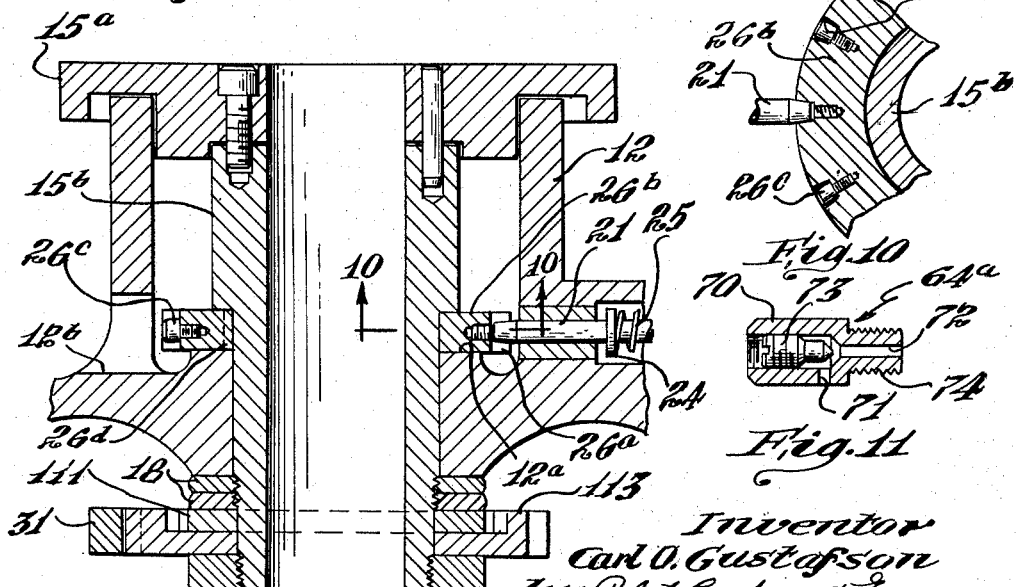

United States Patent Office 2,905,029
Patented Sept. 22, 1959

2,905,029

FLUID PRESSURE INDEXING APPARATUS

Carl O. Gustafson, Lunenburg, Mass., assignor to James Smith & Son, Inc., Worcester, Mass., a corporation of Massachusetts Application January 25, 1954, Serial No. 405,929

13 Claims. (Cl. 77—64)

The present invention relates to the art of hydraulically or pneumatically actuating two or more mechanisms in a desired sequence and particularly to fluid pressure indexing of a work piece holding fixture.

One object of the present invention is to provide an automatic sequencing device and sequencing system for controlling a hydraulic or pneumatic operation such as the indexing and locking of a work piece holding fixture. A further object is to provide a system which may be operated by a single control which initiates an indexing cycle. A further object is to provide a fully automatic system wherein the cycles of the index fixture are controlled by the machine operations on the work piece held in the fixture.

In a broad aspect the invention comprises a source of fluid under pressure, a valving or sequencing device and fluid conduits connecting the aforesaid source with the respective fluid operated mechanisms, the device having a start position in which it interconnects the source and one of the mechanisms to actuate the latter and a second position in which it interconnects the source and the other mechanism to actuate the latter and in which second position it also blocks the conduit to the said one, first actuated, mechanism thereby to hold said one mechanism in actuated condition, said sequencing device including fluid pressure responsive means connected to the source for moving the valve from start to second positions, whereby one of the mechanisms is actuated before and held actuated during actuation of the other mechanism. Preferably the fluid pressure source is controlled and thus may include a supply of fluid under pressure and a controller operable to transmit fluid under pressure to the valving or sequencing device.

In a more specific aspect the sequencing or valving device comprises a valve body having primary and secondary inlets connected to the aforesaid source and ports adapted to be connected to two fluid operated mechanisms respectively, for example a driven and retractable mechanism of an indexing fixture, the sequencing device further including valve means movable between the above-mentioned positions in response to pressure at the secondary inlet.

For the purpose of illustration only a typical embodiment of the invention is shown in the accompanying drawing in which Fig. 1 is a diagrammatic view of a pneumatic indexing system;

Figs. 2 and 3 illustrate different positions of certain parts shown in Fig. 1;

Fig. 4 is a sectional elevation of an indexing fixture;

Fig. 5 is a fragmentary plan view showing a detail of the indexing fixture;

Fig. 6 is an elevation of the indexing fixture of Figs. 1 and 4;

Figs. 7 and 8 show different positions of the parts of a modified pneumatic system;

Fig. 9 is a sectional elevation of a modified indexing fixture;

Fig. 10 is a fragmentary plan view of a detail of the modified fixture; and

Fig. 11 is a sectional view of a part shown in Fig. 7.

The illustrative system shown in Figs. 1 to 6 includes an index fixture 1 having a conventional collet chuck 13 for holding a work piece, a locking device 2 for holding the chuck in position and a rack mechanism 3 for rotating the chuck as will be described more fully hereinafter. A sequencing device 4 controls operation of the locking mechanism 2 and the rack mechanism 3, the sequencing device being actuated by a controller 6. The system is adapted for use with a cycling tool T which performs a series of operations on the work piece held in the collet chuck. The tool T is controlled by a conventional machine control circuit C with which is associated a timing circuit X.

The index fixture 1 has a housing 12 within which are rotatably mounted the chuck 13, a collet sleeve 14 and an indexing sleeve 15. The chuck and collet sleeve have opposed camming laces 13a and 14a respectively. Upwardly movement of the collet sleeve 14 causes its face 14a to apply a camming or wedging action to the face 13a of the chuck and close the chuck. The collet sleeve 14 is lifted by a mechanism including an external handle 17 of a yoke 171 pivotally mounted on the housing 12. Each end of the yoke 171 is connected to a bell crank 172 having a stud 173 which engages in an annular recess 19a of a ring 19 surrounding the indexing sleeve 15. When the handle 17 is lifted the bell crank 173 moves the ring 19 downwardly over one end of cam levers 101 which are pivotally attached to the indexing sleeve 15. The levers 101 are thereby caused to press against the shoulder 174 of an annular recess 175 in the ring 19 so as to lift the collet sleeve 14 and compress the jaws of the chuck 13. As previously mentioned the chuck 13, collet sleeve 14 and index sleeve 15 are rotatably supported in the housing 12. A gear 26 or similar member is secured to the index sleeve 15 so as to support the collet sleeve on a shoulder 12a of the housing 12. The member 26 has recesses 26a engaged by a spring loaded retractable plunger 21 which locks the index sleeve, collet sleeve and chuck against rotation. Secured by lock nuts 18 at the lower end of the index sleeve is a ratchet assembly including a gear ring and a toothed wheel 111 rotatable relative to the ring. A pawl 112 mounted on a gear ring 113 is yieldingly urged by a spring 114 into engagement with the toothed wheel 111 so that clockwise rotation of the gear ring will drive the toothed wheel 111.

The gear ring 113 is engaged by a rack 31 sliding in a housing 32. One end of the housing 32 is an air cylinder portion 33 enclosing a piston member 34 attached to the rack 31. The piston 34 and rack 31 are normally in the position shown in Fig. 1 against an adjustable stop member 37 which may be adjusted into or out of the casing 32 so as to determine the length of the stroke of the rack from normal position. The stop member has a flat on one side in which recesses are drilled at positions determining the rack stroke for indexing between 0° and 360°. The stop member is calibrated in degrees of index by numerals marked on the flat. A set screw 38 engages in a selected recess so as to lock the stop member 37 in adjusted position. The cylinder portion 33 has two ports 35 and 39. When air is applied under pressure through port 39 the piston 34 and rack 31 are driven from the position shown to a forward position. Forward movement of the rack 31 causes clockwise rotation of the gear ring 113, the toothed wheel 111, the indexing sleeve 15, and the chuck 13. The angle through which the chuck is turned depends on the length of the rack stroke. The length of this stroke is determined by the initial position of the rack as determined by the adjustment of the stop 37. According to one aspect of the present invention the rack 31 moves to the initial position against the stop 37 when the rack is not loaded through the gear ring 113, pawl 112 and ratchet wheel 111 by the weight of the rotating index fixture parts and the weight of the work piece carried by the chuck 13. The inertia of the rack and gear ring 113 only is applied to the stop 37 on the return stroke of the rack. When pressure is released from the port 39 pressure applied through port 35 returns the rack 31 to its initial position against the stop 37, during which return movement the pawl 112 disengages from the ratchet wheel 111 and does not tend to turn the ratchet wheel 111 and the index sleeve 115 counterclockwise.

The locking device 2 comprises the retractable plunger or lock pin 21 engaging in the recesses 26a of ring 26 secured to the indexing sleeve 15. The pin 21 is carried by a piston 23 reciprocating in a cylinder 22. The cylinder 22 has an inlet port 24 to which air pressure may be applied to retract the lock pin 21 against the force of a spring 25. Each time the stop pin is retracted one end of the stop pin 21 closes a switch S2 to be described more fully hereinafter.

The sequencing device 4 controls the order in which air pressure is applied to the rack piston 34 and the locking member 2 respectively. As indicated in detail in Fig. 2 the sequencing device 4 comprises a cylindrical casing 41 enclosing an internal chamber 42. The housing 41 is provided with a primary inlet N1 entering intermediate the ends of the chamber 42, a secondary inlet N2 entering at one end of the chamber 42, a first distribution port P1, a second distribution port P2, an exhaust port P3 and a bleeder opening 43. Sliding within the chamber 42 is a piston member 44 having wall members 45 which divide the chamber 42 into subchambers 42a and 42b, and a piston face 46 opposite the secondary inlet N2. A spring 47 normally holds the piston 44 in a start position as shown in Fig. 1. When air is applied through the secondary inlet N2 to the piston face 46, the piston 44 is moved from its start position as shown in Fig. 1 through an intermediate position as shown in Fig. 2 to a final position as shown in Fig. 3. Release of the pressure at the secondary inlet N2 permits the spring to return the piston 44 from its final position, through intermediate position to start position.

Application to and release of air from the secondary inlet N2 is effected by the controller 6 which interconnects a supply 90 of air under pressure with the sequencing device. The controller 6 comprises a tubular housing 61 having an inlet port 62 connected through conduit 91 to the supply 90, an outlet port 63 connected through conduit 92 to the sequencing device inlets N1 and N2, an exhaust port 64, a bleeder port 65 and a port 66 connected through a conduit 93 to the port 35 of the rack cylinder 33. Sliding within the tubular housing 61 is a piston 60 actuated by a solenoid K1 or a hand operated arm 67. Actuation of the solenoid K1 or the arm 67 moves the piston 60 from the position shown in Fig. 1 in which the port 66 is connected to the air inlet 62, to the position shown in Fig. 2 in which the inlet port 62 is connected to the outlet port 63 so that air from the supply 90 is applied through conduits 91 and 92 to the sequencing device inlets N1 and N2.

The cycle of pneumatic operation is as follows. When the position of the controller 6 is transferred from the first position as shown in Fig. 1 to the second position as shown in Fig. 2 air pressure is applied through the controller to the sequencing device inlets N1 and N2. The secondary inlet N2 is more restricted than inlet N1 and, hence, before air pressure applied at the face 46 of the piston 44 causes the piston to move, air enters first through the primary inlet N1. Air pressure then passes through sub-chamber 42a to the first distribution port P1 as shown in Fig. 1 and thence along a path I through a conduit 94 to the inlet 24 of the locking device 2 and causes the locking piston 23 to retract the lock pin 21 and free the gear 26 and index sleeve 15 for rotary movement.

The piston 44 of the sequencing device 4 then moves into the intermediate position shown in Fig. 2. In this position air under pressure is transmitted on a path II from the primary inlet N1 through sub-chamber 42a to the second port P2 which, by movement of the piston 44 and its walls 45, now communicates with the primary inlet while the first port P1 is blocked by the middle wall 45. Air under pressure from the second port P2 through a conduit 95 to the inlet port 39 of the rack cylinder 33 causing the rack to be driven to forward position and simultaneously indexing the index sleeve 15 through the ratchet mechanism shown in Fig. 5. This forward movement of the rack occurs while the sequencing device is in its intermediate position of Fig. 2 and while the first port P1 is blocked as aforesaid holding the locking pin 21 out of engagement with the gear 26.

When the sequencing piston 44 advances to its final position as shown in Fig. 3 the inlet port N1 is blocked by the middle wall 45 of the piston 44, while the first port P1 is connected through sub-chamber 42b with the exhaust port P3. This connection permits air to drain from the locking cylinder 22 through the conduit 94, primary port P1, sub-chamber 42b out the exhaust port P3 allowing the locking pin 21 to re-engage the gear wheel 26 and lock the index sleeve 15 and chuck 13 in adjusted position. Thus the locking pin is held out of engagement with the gear 26 during the time that the rack 31 is rotating the index sleeve 15 and chuck 13. To insure that the period of movement of piston 44 is coordinated with movement of the rack 31, the secondary inlet N2 is provided with an adjustable needle valve member 48 (Fig. 2) which controls the flow of air through the secondary inlet N2 to the piston face 46 and thus governs the speed with which the piston 44 will travel from its start position of Fig. 1 to its final position of Fig. 3. After the chuck 13 has been indexed to adjusted position and locked in its new position the controller may be returned to normal position under the influence of a spring 68 by releasing the hand lever 67 of the solenoid K1. In its normal position as shown in Fig. 1 the air controller connects secondary inlet N2 through conduit 92 and port 63 to an exhaust port 69 thus relieving air pressure from the face 46 of the piston 44 and allowing it to return to start position under the influence of spring 47. In returning to start position the piston 44 again passes through the intermediate position of Fig. 2 and in this position it connects the second distribution port P2 to the primary inlet N1 from which pressure has been relieved by the controller 6. This permits the rack piston 34 to return to its initial position of Fig. 1 under reverse pressure applied through rack port 35 from the controller port 66 which now communicates with the air supply through inlet 62.

From the above it can be seen that the complete indexing cycle is accomplished by a single movement of the controller 6. The controller solenoid K1 may be actuated manually through switch S1 or through a control circuit including the tool switch S3. This circuit includes power terminals D, wires 110 and the tool switch S3. As is conventional in the art the tool switch S3 is arranged to be closed at the end of the machining operation performed by the tool T. For example, if two holes are to be bored on radii of a work piece 180° apart, the cycling tool will comprise a press drill which descends to drill one of the holes and rises after the hole is drilled, thereby closing the switch S3. Closing of the switch S3 will energize the solenoid K1 and operate controller 6 to initiate the indexing cycle. Previously the adjustable stop 37 of the rack is set so that the forward stroke of the rack will turn the chuck 180° to bring the work piece into position for drilling of the second hole. During the indexing operation the lock pin 21 actuates the switch S2 associated with the timer X. The function of the timer, which is well known in the art and does not in itself comprise a part of the present invention, is to count the number of times the work piece is indexed. In the above given example each work piece will be drilled two times and thus need be indexed only one time between drillings. The timer counts the one indexing cycle and conditions the control circuit C so that it will shut off the drill cycling mechanism at the end of its second drilling operation. The switch S4 is placed parallel to the timer to permit manual starting of the machine cycle. It will be obvious that three or more operations may be performed on a single work piece in which case the timing circuit X will count each operation by counting the number of times the work piece is indexed.

By virtue of the above-described system it is possible to clamp a work piece in the chuck 13 by raising and lowering the handle 17 and thus initiate a machine operating cycle and concomitant indexing cycles by operation of the switch S4. The machine and index fixture will go through their respective cycles without further attention until the end of the desired number of machine cycles at which time the machine operations will cease thereby indicating that a new work piece may be placed in the chuck.

A modified system is shown in Figs. 7 to 11 wherein the collet chuck 13 of Fig. 1 is replaced by a dial table 15a to which may be secured work pieces not suitable to be clamped in a chuck. The dial table is fastened to an index sleeve 15b rotatably supported in the housing 12 as well as being supported for downward thrust and side thrust by the same housing 12. A modified ring 26b is secured to the sleeve 15b by a key or dowel 26d, the sleeve supporting the collet sleeve on shoulder 12a of the housing 12.

Indexing of the dial table 15a is effected by the rack 31 through the gear ring 113 and ratchet wheel 111 secured to the lower end of the index sleeve 15b in the same manner as was described for the embodiment of Figs. 1, 4 and 6. More accurate locking of the table is achieved by means of a modified index ring 26b as shown in Fig. 10. Each recess 26a of the ring 26b is tapped to receive a block out screw 26c. The block out screw 26c has a flat head substantially filling its recess and preventing the stop plunger 21 from engaging in the recess and locking the index sleeve 15b. Should it be desired to index the table 15a through an angle not accurately determined by the rack stop member 37 two or more block out screws are removed from their recesses through an access opening 12b in the casing 12. As will be explained in more detail the system of Figs. 7 and 9 releases the retracted stop plunger 21 during the indexing movement, but the plunger rides over block out screws not removed and is prevented from engaging the ring 26b until an empty recess is presented. For most purposes an index plate having twenty-four recesses may be used. A twenty-four recess plate will afford an indexing angle of 15° or a multiple thereof. As shown in Fig. 10, the recesses 26a and the end of the stop pin or plunger 21 are tapered so that the pin will center in the recess accurately despite wear.

By providing block out screws or similar removable inserts and releasing the stop pin 21 during the indexing movement, the stop pin will drop into the proper recess and lock the indexing and sleeve despite improper adjustment of the stop 37. Furthermore, block out screws may be removed at different angular intervals so that the table will, on successive indexing movements, be rotated different angular increments.

A modified pneumatic system shown partially in Figs. 7 and 8 is arranged like that of Fig. 1 with a change best shown by comparing Figs. 3 and 8. In Fig. 3 the walls 45 of the sequence valve piston member are spaced such that in the final position the primary air inlet N1 is blocked before the first outlet port P1 is connected to the exhaust port P1. Thus in the system of Figs. 1 to 3 the rack movement is completed before the stop pin 21 is released. In Fig. 8 it will be noted that the walls 45a of the piston 45 are spaced such that the primary inlet N1 is not blocked when the first port P1 is connected with the exhaust port P3. This spacing permits the stop pin to be released by bleeding air from the stop pin line 94 while air forced through the secondary port P2 is driving the rack. Then, as previously explained, the stop pin 21 is free to drop in any unblocked recess which is indexed to the pin.

It should be understood that the present disclosure is for the purpose of illustration only and that this invention includes all modifications and equivalents which fall within the scope of the appended claims.

I claim:

1. In the art of controlling machine operating cycles, apparatus comprising first and second fluid pressure operated mechanisms, a source of fluid under pressure, a fluid pressure distributor, a controller connected to said source for transmitting fluid pressure to and relieving fluid pressure from said distributor, said distributor comprising a cylinder enclosing a chamber, primary and auxiliary inlets respectively intermediate the ends and at one end of said chamber, first, second and third ports radially communicating with said chamber, a piston movable in said chamber from a start position through an intermediate to an end position in response to fluid pressure at said auxiliary inlet, resilient means yieldingly urging said piston to start position, and wall members on said piston dividing said chamber into two subchambers, a conduit connecting said controller and inlets, and conduits between said first and second ports and said first and second mechanisms respectively, said wall members being spaced such that in said start and intermediate positions each one of said first and second ports successively communicate with said primary inlet through one of said subchambers while the other parts are blocked by said wall members, and in said final position said second port communicates with the third port through the other subchamber, said piston returning through intermediate position when pressure is relieved from said primary inlet by said controller, in which position pressure is relieved from said second port through said primary inlet, so that in sequence fluid pressure is applied to and relieved from said first and second mechanisms successively, whereby said two mechanisms are operated in sequence by a single application and release of pressure to said device.

2. A fluid pressure distribution device comprising a cylinder enclosing a chamber, primary and auxiliary inlets respectively intermediate the ends and at one end of said chamber, first, second and third ports radially communicating with said chamber, a piston movable in said chamber from a start position through an intermediate to an end position in response to fluid pressure at said auxiliary inlet, resilient means yieldingly urging said piston to start position, and wall members on said piston dividing said chamber into two subchambers, said wall members being spaced such that in said start and intermediate positions each one of said first and second ports successively communicate with said primary inlet through one of said subchambers, and in said final position said second port communicates with the third port through the other subchamber, said piston returning through intermediate position when pressure is relieved from said primary inlet, in which position pressure is relieved from said second port through said primary inlet, so that in sequence fluid pressure is applied to and relieved from said first and second ports successively, whereby two fluid pressure operations may be performed in sequence by a single application and release of pressure to said device.

3. A fluid pressure distribution device comprising a cylinder enclosing a chamber, primary and auxiliary inlets respectively intermediate the ends and at one end of said chamber, first, second and third ports radially communicating with said chamber, a piston movable in said chamber from a start position through an intermediate to an end position in response to fluid pressure at said auxiliary inlet, resilient means yieldingly urging said piston to start position, wall members on said piston dividing said chamber into two subchambers, said wall members being spaced such that in said start and intermediate positions each one of said first and second ports successively communicate with said primary inlet through one of said subchambers, and in said final position said second port communicates with the third port through the other subchamber, said piston returning through intermediate position when pressure is relieved from said primary inlet, in which position pressure is relieved from said second port through said primary inlet, so that in sequence fluid pressure is applied to and relieved from said first and second ports successively, whereby two fluid pressure operations may be performed in sequence by a single application and release of pressure to said device, and adjustable means in said secondary inlet for controlling the rate of flow through said inlet thereby to control the speed at which said piston moves from start to end position, whereby the rate at which said fluid operations are performed may be varied.

4. A fluid pressure distribution device comprising a cylinder enclosing a chamber, primary and auxiliary inlets respectively intermediate the ends and at one end of said chamber, first, second and exhaust ports radially communicating with said chamber, a piston slidable in said chamber from a start position through an intermediate to an end position in response to fluid pressure at said auxiliary inlet, resilient means yieldingly urging said piston to start position, and wall members on said piston dividing said chamber into two subchambers, said wall members being spaced such that in said start position said first communicates with said primary inlet through one of said subchambers while the other ports are blocked by said wall members, in said intermediate position said second port communicates with said primary inlet through said one subchamber and said first port is blocked by one of said wall members, and in said final position said second port communicates with the exhaust port through the other subchamber, said piston returning through intermediate position when pressure is relieved from said primary inlet, in which position pressure is relieved from said second port through said primary inlet, so that in sequence fluid pressure is applied to and relieved from said first and second ports successively, whereby two fluid pressure operations may be performed in sequence by a single application and release of pressure to said device.

5. In the art of adjusting the position of a work piece preparatory to a machine operation thereon, apparatus comprising a housing, a work piece holding chuck rotatably mounted in said housing, a fluid retractable mechanism normally locking the chuck against rotation, ratchet means for driving the chuck in one direction, a fluid driven rack mechanism engaging said ratchet means and having a forward and rearward stroke, said forward stroke driving said ratchet means and chuck in said one direction, a fixed stop limiting said forward stroke, and an adjustable stop limiting said rearward stroke, whereby the forward stroke is determined by limiting the adjusted rearward stroke when the chuck is disengaged from and does not load said ratchet means and rack mechanism, a source of fluid under pressure, a valving device and fluid conduits interconnecting said source with said mechanisms respectively, said device having a start position in which it interconnects said source and said retractable mechanism to actuate the latter and a second position in which it interconnects said source and the rack mechanism to actuate the latter and in which it blocks the conduit to said retractable mechanism thereby to hold said retractable mechanism actuated, and said device including fluid pressure responsive means connected to said source for moving said valve from start to second position, whereby said retractable mechanism is actuated before and held actuated during actuation of the rack mechanism.

6. In the art of controlling two fluid pressure actuated mechanisms, apparatus comprising a valving device having an inlet for connection to a source of fluid under pressure, outlets for connection to said mechanisms respectively, and an exhaust port, said device including a movable piston member having at least a start and a second position, wall members on said piston forming chambers arranged such that in said first position a chamber interconnects said inlet and one of said outlets and in said second position a chamber interconnects said source and the other outlet while a wall member blocks the first said outlet and the exhaust port, and said device including fluid pressure responsive means connected to said source for moving said member from start to second position, whereby one mechanism may be actuated before and held actuated during actuation of the other mechanism by application of pressure to said first outlet and maintenance of pressure at said first outlet during subsequent application of pressure to the other outlet.

7. In the art of controlling two fluid pressure actuated mechanisms, apparatus comprising a controller adapted to be connected to a supply of fluid under pressure and operable to transmit fluid under pressure, a valving device having an inlet connected to said controller and at least two outlets, fluid conduits connecting said outlets with said mechanisms respectively, said device including a movable member having at least a start and a second position, wall members on the said movable member forming chambers arranged such that in said first position said movable member interconnects said controller and one of said mechanisms to actuate the latter and in said second position it interconnects said controller and the other mechanism to actuate the latter, a wall member blocking the outlet to said one mechanism thereby to hold said one mechanism actuated under pressure, and said device including fluid pressure responsive means connected to said controller for moving said movable member from start to second position, whereby said one mechanism is actuated before and held actuated during actuation of the other mechanism by a single operation of said controller.

8. In the art of adjusting the position of a workpiece preparatory to a machine operation thereon, apparatus comprising a fixture having a workpiece holder and including fluid driven means for moving the workpiece holder and fluid retractable means normally locking said driven means against movement, a controlled source of fluid under pressure, a valving device having primary and secondary inlets connected to said source, two ports connected to said driven and locking means respectively and an exhaust port, a valve member movable from a start to a second position in response to pressure at said secondary inlet, the said member having walls forming chambers arranged such that in said first position it interconnects said primary inlet and the port connected to said locking means to retract the latter and in said second position said member interconnects said primary inlet and the port connected to said driven means thereby to move the holder to an adjusted position and said member being arranged so that in said second position a wall blocks the port connected to the locking means and the exhaust port thereby to hold said locking means retracted, and fluid pressure responsive means connected to said source for moving said member from start to second position, whereby said locking means is retracted and held retracted before movement of said driven means.

9. In the art of adjusting the position of a workpiece preparatory to a machine operation thereon, apparatus comprising a fixture having a workpiece holder and including fluid driven means for moving the workpiece and holder and fluid retractable means normally locking said driven means against movement, a sequencing device, means to supply fluid under pressure, fluid conduits interconnecting said supply means, said device and said driven and retractable means, respectively, said device comprising a valve member having a start, an intermediate and a final position, the said member having walls thereon forming chambers arranged such that in said first position it interconnects said supply and locking means to retract the latter, in said intermediate position a wall of said valve member blocks the supply to the locking means thereby to hold said locking means momentarily retracted and interconnects said supply and driven means thereby to move the holder to an adjusted position, and in said final position said valve member exhausts fluid from the locking means thereby to cause said means to lock said driven means and workpiece holder in adjusted position, and fluid pressure responsive means for moving said valve member between said positions, whereby said locking means is retracted before and released subsequent to the beginning of movement of said driven means.

10. Apparatus for repeatedly adjusting the position of a workpiece preparatory to operation thereon by a machine having recurrent cycles, said apparatus comprising a housing, a workpiece holder rotatably mounted therein, retractable means having a biased position locking said holder against rotation, means for driving the holder in one direction only in timed relation to the locking means, said locking means being retracted from locking position during a period of rest of the holder driving means, means actuated after each cycle of said apparatus to retract said locking means after each cycle, switch means operated by actuation of said locking means, and means actuated by said switch means indicating the number of actuations of said locking means, said switch means including an electric circuit operative to stop the operation of the machine, whereby a workpiece may be automatically indexed according to a predetermined number of machine operations.

11. A device of the class described comprising a base, a workpiece holder mounted on said base, the workpiece holder being movable thereon from one indexed position to another, locking means for locking said holder in indexed position, means for actuating said locking means to lock or unlock the holder, means to move said holder while the same is unlocked, and counting means operatively associated with and actuated by said locking means in the motion of said locking means, said counting means being operative to count the number of actuations of said locking means.

12. A device of the class described comprising a base, a workpiece holder mounted on said base, the workpiece holder being movable thereon from one indexed position to another, locking means for locking said holder in indexed position, means for actuating said locking means to lock or unlock the holder, means to move said holder while the same is unlocked, and counting means operatively associated with and actuated by said locking means in the motion of said locking means, said counting means being operative to count the number of actuations of said locking means, said counting means including an electric circuit means for stopping the apparatus after a predetermined number of actuations of said locking means as counted by said counting means.

13. An apparatus of the class described comprising a housing, a workpiece holder rotatably mounted thereon, a movable element to lock said workpiece holder in predetermined rotative position in the housing, means rotating said work holder in one direction only, a counting device operatively connected to said locking element and actuated thereby to control the number of actuations of the rotating means, said counting device including means actuated by the locking element for stopping the action of the apparatus after a predetermined number of actuations of the locking element, and means operating the work holder rotating means and the movable locking element.

References Cited in the file of this patent
UNITED STATES PATENTS

| | | |
|---|---|---|
| 1,130,920 | Miller | Mar. 9, 1915 |
| 1,199,640 | Vincent | Sept. 26, 1916 |
| 1,909,766 | Johnson et al. | May 16, 1933 |
| 1,909,767 | Johnson et al. | May 16, 1933 |
| 2,214,308 | Polak | Sept. 10, 1940 |
| 2,358,503 | Godfriaux | Sept. 19, 1944 |
| 2,423,367 | Bolender | July 1, 1947 |
| 2,453,600 | Soden | Nov. 9, 1948 |
| 2,701,552 | Light | Feb. 8, 1955 |
| 2,711,157 | Halward | June 21, 1955 |